United States Patent
De Schepper et al.

(10) Patent No.: US 10,116,579 B2
(45) Date of Patent: Oct. 30, 2018

(54) METHOD AND SYSTEM FOR QUEUE MANAGEMENT IN A PACKET-SWITCHED NETWORK

(71) Applicant: Alcatel Lucent, Boulogne-Billancourt (FR)

(72) Inventors: Koen De Schepper, Edegem (BE); Ing-Jyh Tsang, Waasmunster (BE)

(73) Assignee: Alcatel Lucent, Boulogne Billancourt (FR)

( * ) Notice: Subject to any disclaimer, the term of this patent is extended or adjusted under 35 U.S.C. 154(b) by 26 days.

(21) Appl. No.: 15/027,131

(22) PCT Filed: Oct. 27, 2014

(86) PCT No.: PCT/EP2014/072976
§ 371 (c)(1),
(2) Date: Apr. 4, 2016

(87) PCT Pub. No.: WO2015/063018
PCT Pub. Date: May 7, 2015

(65) Prior Publication Data
US 2016/0241484 A1   Aug. 18, 2016

(30) Foreign Application Priority Data
Oct. 30, 2013   (EP) .................................... 13306486

(51) Int. Cl.
*H04L 1/00* (2006.01)
*H04L 12/867* (2013.01)
(Continued)

(52) U.S. Cl.
CPC ............ *H04L 47/629* (2013.01); *H04L 47/11* (2013.01); *H04L 47/12* (2013.01); *H04L 47/196* (2013.01);
(Continued)

(58) Field of Classification Search
None
See application file for complete search history.

(56) References Cited

U.S. PATENT DOCUMENTS

| 6,888,824 B1 * | 5/2005 | Fang ..................... H04L 49/103 370/359 |
| 7,283,536 B2 * | 10/2007 | Ruutu ..................... H04L 45/00 370/395.4 |

(Continued)

FOREIGN PATENT DOCUMENTS

| JP | 2001-086127 A | 3/2001 |
| JP | 2006-511137 A | 3/2006 |

(Continued)

OTHER PUBLICATIONS

J. Gibbens and F. P. Kelly, "On Packet Marking at Priority Queues," IEEE Transactions on Automatic Control, vol. 47, No. 6, Jun. 2002, XPO 11067998 (hereafter "Gibbens02"), pp. 1016-1020.

(Continued)

*Primary Examiner* — Kwang B Yao
*Assistant Examiner* — Juvena Loo
(74) *Attorney, Agent, or Firm* — Harness, Dickey & Pierce, P.L.C.

(57) ABSTRACT

A method for queue management in a packet-switched network including at an intermediate node receiving first packets belonging to a first class associated with a first queue management mechanism and second packets belonging to a second class associated with a second queue management mechanism; marking or dropping of the first packets in accordance with the first queue management mechanism and marking or dropping of the second packets in accordance with the second queue management mechanism; and coupling the marking or dropping of the second packets to the marking or dropping of the first packets.

15 Claims, 6 Drawing Sheets

(51) Int. Cl.
   *H04L 12/875*   (2013.01)
   *H04L 12/801*   (2013.01)
   *H04L 12/851*   (2013.01)
   *H04L 12/833*   (2013.01)
   *H04L 12/823*   (2013.01)
   *H04L 12/863*   (2013.01)

(52) U.S. Cl.
   CPC ............. *H04L 47/24* (2013.01); *H04L 47/31* (2013.01); *H04L 47/32* (2013.01); *H04L 47/56* (2013.01); *H04L 47/6215* (2013.01)

(56) References Cited

U.S. PATENT DOCUMENTS

| | | | | |
|---|---|---|---|---|
| 8,213,453 | B1* | 7/2012 | Voruganti | H04L 47/32 |
| | | | | 370/235 |
| 8,565,231 | B2 | 10/2013 | Gai et al. | |
| 2001/0051992 | A1* | 12/2001 | Yang | H04L 47/10 |
| | | | | 709/207 |
| 2003/0225903 | A1* | 12/2003 | Lodha | H04L 41/0896 |
| | | | | 709/232 |
| 2004/0120252 | A1 | 6/2004 | Bowen et al. | |
| 2006/0171318 | A1 | 8/2006 | Bergamasco et al. | |
| 2007/0058536 | A1* | 3/2007 | Vaananen | H04L 47/10 |
| | | | | 370/230 |
| 2011/0007687 | A1* | 1/2011 | Howe | H04W 72/1242 |
| | | | | 370/328 |
| 2013/0016610 | A1 | 1/2013 | Kutscher et al. | |
| 2014/0169788 | A1* | 6/2014 | Hussain | H04L 12/00 |
| | | | | 398/43 |
| 2014/0301195 | A1* | 10/2014 | Briscoe | H04L 47/11 |
| | | | | 370/230.1 |
| 2014/0321274 | A1* | 10/2014 | Gahm | H04L 47/326 |
| | | | | 370/231 |

FOREIGN PATENT DOCUMENTS

| | | |
|---|---|---|
| JP | 2006-324988 A | 11/2006 |
| WO | WO-2013132213 A1 | 9/2013 |
| WO | WO-2013151468 A1 | 10/2013 |

OTHER PUBLICATIONS

S. Athuraliya, D. Lapstey and S. H. Low, "An enhanced Random Early Marking algorithm for Internet flow control," Proc. Infocom 2000, Israel, pp. 1425-1434.

International Search Report PCT/ISA/210 for International Application No. PCT/EP2014/072976 dated Nov. 18, 2014.

Hayato Hoshirara et al., Proposal of High Quality and Fair Network Using Packet Transport Technology, IEICE Technical Report vol. 112 No. 231, Japan, The Institute of Electronics, Information and Communication Engineers, Oct. 4, 2012.

* cited by examiner

METHOD AND SYSTEM FOR QUEUE MANAGEMENT IN A PACKET-SWITCHED NETWORK

CROSS-REFERENCE TO RELATED APPLICATIONS

This application is a national phase under 35 U.S.C. § 371 of PCT International Application No. PCT/EP2014/072976 which has an International filing date of Oct. 27, 2014, which claims priority to European Application No. EP 13306486.5, filed Oct. 30, 2013, the entire contents of each of which are hereby incorporated by reference.

FIELD OF INVENTION

The field of the invention relates to methods and systems for queue management in a packet switched network, in particular to a method and system where packets may be dropped or marked in an intermediate node.

BACKGROUND

Different congestion control mechanisms have been developed. Up to now all congestion control mechanisms assumed the same congestion to feedback function, i.e. packet drop or delay on a tail-drop queue, and a fair response to packet drop is to respond as a function that approximates the Transmission Transport Protocol (TCP) Reno algorithm. To avoid latency, alternative mechanisms are needed; however, these alternative mechanisms do not match either the average queuing delay or packet loss probability of TCP Reno. Data Center TCP (DCTCP) is an example of such an alternative mechanism, but other congestion control mechanisms are also possible.

Today it is not possible or accepted to deploy Active Queue Management (AQM) and congestion controllers that are not 'TCP friendly'. New initiatives are restricted to walled deployments separated from the internet, e.g. Data Centers. Some improvements are made, but some kind of 'TCP friendly' behavior is expected, and the more a new congestion control mechanism deviates from this, the more resistance the protocol gets for deployment. Further, dedicated in-network measures have to be taken to enforce the flows to meet the fairness metrics, e.g. Fair Queuing.

Today the different traffic types are separated in different 'pipes' with different capacities assigned to them, independently of the number of flows that are active in them. One pipe can be overloaded with many flows each getting only a small amount of bandwidth, while the other pipe might have only a few flows each getting a big amount of bandwidth.

SUMMARY

The object of embodiments of the invention is to provide a method and system allowing different classes of traffic to operate over the same network whilst ensuring fairness. The different classes may use different congestion mechanisms in the end points, or may use the same congestion mechanism with different parameters. The object of particular embodiments of the invention consists in allowing DCTCP flows over the same network as TCP Reno or TCP New Reno flows, whilst ensuring that all traffic flows get a fair share.

According to a first aspect of the invention, there is provided a method for queue management in a packet-switched network comprising a sending node, a receiving node, and one or more intermediate network nodes, wherein the one or more intermediate network nodes are mutually coupled by a plurality of links thereby forming paths for the routing of packet flows between the sending node and receiving node, the method comprising at an intermediate node:

receiving first packets belonging to a first class of traffic associated with a first queue management mechanism and second packets belonging to a second class of traffic associated with a second queue management mechanism;

marking or dropping of the first packets in accordance with the first queue management mechanism and marking or dropping of the second packets in accordance with the second queue management mechanism; and coupling the marking or dropping of the second packets to the marking or dropping of the first packets.

Embodiments of the invention are based inter alia on the insight that it is possible to couple the marking or dropping of the different classes of traffic that are received at an intermediate node. This coupling is possible e.g. using respective response functions of the congestion controllers in the endpoints. By introducing such a coupling the fair sharing of available network resources between the flows of first packets using a first queue management mechanism and second packets using a second queue management mechanism, can be improved and/or a predetermined sharing can be envisaged.

This method provides a way to give a fair share or a predetermined share of the available bandwidth to all flows of all classes of traffic in packet-switched networks with mixed classes of traffic, while still respecting the accepted needs of established types of traffic.

According to a possible embodiment, the marking or dropping of the first packets is performed in accordance with a first marking or dropping probability and the marking or dropping of the second packets is performed in accordance with a second marking or dropping probability; and the coupling comprises computing the second marking or dropping probability based on a measure which is representative for the first marking or dropping probability. The first marking or dropping probability may be measured in case of a passive first queue management mechanism, such as a taildrop queue system, or may be a value which is computed e.g. based on a queue size, in case of an active first queue management mechanism. More generally, the received first and second packets may be stored in at least one queue buffer, and the first marking or dropping probability may be determined based on a measure related to the number of first and second packets in the at least one queue buffer, such as an instantaneous queue length, average queue length, packet sojourn time, incoming traffic rate, outgoing traffic rate, instantaneous packet queue overflow, average queue overflow rate, and others known by the person skilled in the art and used in state of the art active queue management (AQM) systems. In other words, a queue buffer temporarily holds the packets that have been received, and it is then possible to drop or mark packets that are temporarily stored in the queue buffer, according to the specific queue management mechanism using the first marking or dropping probability and the coupled second marking or dropping probability. If more than one queue buffer is provided, e.g. one queue buffer for each type of queue management mechanism, there may be used a measure related to the number of first packets in a first queue for calculating the first marking or dropping probability, or there may be used a measure related to the number of first and second packets in a first and second queue to calculate the first marking or dropping probability.

According to another embodiment, the receiving comprises classifying the first packets in a first queue and the second packets in a second queue; and the coupling comprises scheduling the transmission of marked or non-dropped first and second packets from the first queue and the second queue in accordance with a first and a second weight. Preferably, a first used bandwidth is measured for the first packets and a second used bandwidth is measured for the second packets; wherein the first and second used bandwidth is used to calculate the first and the second weight, respectively. More preferably, the marking or dropping of the first packets is performed in accordance with a first marking or dropping probability and the marking or dropping of the second packets is performed in accordance with a second marking or dropping probability; wherein the first and second marking or dropping probability is used to determine the first and second weight, respectively. By calculating the first and second weight in function of the first and second bandwidths and/or dropping probabilities, the filling level of the first and second queue may be influenced in function of the received packet flows, which will in turn influence the first and second dropping probabilities used by the first and second queue management mechanisms, allowing to ensure a fair share to the flows.

According to yet another embodiment the receiving comprises classifying the first packets in a first queue and the second packets in a second queue; and the coupling comprises scheduling the transmission of marked or non-dropped second packets from the second queue with priority compared to the marked or non-dropped first packets of the first queue. Note that also in this embodiment the marking or dropping of the first packets may be performed in accordance with a first marking or dropping probability and the marking or dropping of the second packets may be performed in accordance with a second marking or dropping probability which is determined based on a measure which is representative for the first marking or dropping probability. More in particular the second marking or dropping probability may be determined as a maximum between a first value calculated on the basis a measure related to the number of first packets in a first queue, and a second value calculated on the basis of a measure related to the number of second packets in a second queue. By using a priority scheduling it can be ensured that a low latency class is effectively treated low latency, whilst the coupling ensures the fairness.

In a preferred embodiment the coupling is such that flows of the first packets and flows of the second packets are given a predetermined share, in particular a fair share, of an available bandwidth.

According to a preferred embodiment, the classes of traffic are associated with any one of the following congestion protocols: Transmission Control Protocol (TCP) Reno, Transmission Control Protocol (TCP) New Reno, CUBIC Transmission Control Protocol (TCP), High Speed TCP, Compound TCP, Scalable TCP, User Datagram Protocol (UDP) using TCP Friendly Rate Control (TFRC), Multiple TCP (MULTCP), Multiple TFRC (MULTFRC), Datagram Congestion Control Protocol (DCCP), Data Center TCP (DCTCP), $D^2TCP$, $D^3TCP$. However, the person skilled in the art will appreciate that other protocols are possible. Embodiments of the invention allow combining e.g. TCP (New) Reno with DCTCP over the same network, wherein all traffic behaves according to fair share. In prior art methods it is not possible to have both types of traffic share the same network, as DCTCP will push all TCP Reno traffic away. A congestion control mechanism in senders that behaves backwards compatible such as TCP Reno on tail-drop queues is generally accepted. Using embodiments of the method of the invention, it can also work TCP-friendly when new active queue management systems are present in the network.

According to another aspect, there is provided a system for queue management in a packet-switched network. The system comprises a receiving module for receiving first packets belonging to a first class associated with a first queue management mechanism and second packets belonging to a second class associated with a second queue management mechanism. The system is configured for marking or dropping of the first packets in accordance with the first queue management mechanism and for marking or dropping of the second packets in accordance with the second queue management mechanism; and for coupling the marking or dropping of the second packets to the marking or dropping of the first packets.

In a preferred embodiment the system is adapted for coupling the marking or dropping of the second packets to the marking or dropping of the first packets such that flows of the first packets and flows of the second packets are given a predetermined share, in particular a fair share, of an available bandwidth.

In a possible embodiment the system is adapted for marking or dropping of the first packets in accordance with a first marking or dropping probability. The system further comprises a controller configured for marking or dropping of the second packets in accordance with a second marking or dropping probability; and a computing module configured for computing the second marking or dropping probability based on a measure which is representative for the first marking or dropping probability. Such a computing module will ensure that the second probability is coupled to the first probability, so that fairness can be given. Further a measuring device may be included configured to measure a queue parameter which may be used to determine the first marking or dropping probability. In an embodiment the system comprises at least one queue buffer for storing the received first and second packets. The computing module is further configured for determining the first marking or dropping probability based on a measure related to the number of first and second packets in the at least one queue buffer.

In a possible embodiment the receiving module comprises a classifier for classifying the first packets in a first queue and the second packets in a second queue. The system then further comprises a scheduler configured for scheduling the transmission of marked or non-dropped first and second packets from the first queue and the second queue in accordance with a first and a second weight. Optionally the system comprises a bandwidth measuring device configured for measuring a first used bandwidth for the first packets and a second used bandwidth for the second packets; and a weight calculator configured for using the first and second used bandwidth to calculate the first and the second weight. Optionally the system is configured for marking or dropping of the first packets in accordance with a first marking or dropping probability and marking or dropping of the second packets in accordance with a second marking or dropping probability. Preferably the weight calculator is configured to calculate the first and second weight based on the first and second marking or dropping probability as well as on the first and second measured bandwidth, respectively.

In another possible embodiment the receiving module comprises a classifier configured for classifying the first packets in a first queue and the second packets in a second queue. The system comprises a priority scheduler configured for scheduling the transmission of marked or non-dropped second packets from the second queue with priority compared to the first packets of the first queue. Note that also in this embodiment the marking or dropping of the first packets may be performed in accordance with a first marking or dropping probability and the marking or dropping of the second packets may be performed in accordance with a second marking or dropping probability which is determined based on a measure which is representative for the first marking or dropping probability. More in particular the system may comprise a computing module configured to determine the second marking or dropping probability as a maximum between a first value calculated on the basis a measure related to the number of first packets in a first queue, and a second value calculated on the basis of a measure related to the number of second packets in a second queue. By using a priority scheduler it can be ensured that a low latency class is effectively treated low latency, whilst the computing module ensures the fairness.

In a preferred embodiment the first and second class are associated to any of the following protocols: Transmission Control Protocol (TCP) Reno, Transmission Control Protocol (TCP) New Reno, CUBIC Transmission Control Protocol (TCP), High Speed TCP, Compound TCP, Scalable TCP, User Datagram Protocol (UDP) using TCP Friendly Rate Control (TFRC), Multiple TCP (MULTCP), Multiple TFRC (MULTFRC), Datagram Congestion Control Protocol (DCCP), Data Center TCP (DCTCP), $D^2TCP$, $D^3TCP$.

According to another aspect of the invention, there is also a computer device or other hardware device that is programmed to perform the computing and controlling of embodiments of the method set out above.

BRIEF DESCRIPTION OF THE FIGURES

The accompanying drawings are used to illustrate presently preferred non-limiting exemplary embodiments of devices of the present invention. The above and other advantages of the features and objects of the invention will become more apparent and the invention will be better understood from the following detailed description when read in conjunction with the accompanying drawings, in which.

DESCRIPTION OF EMBODIMENTS

Figure 1:
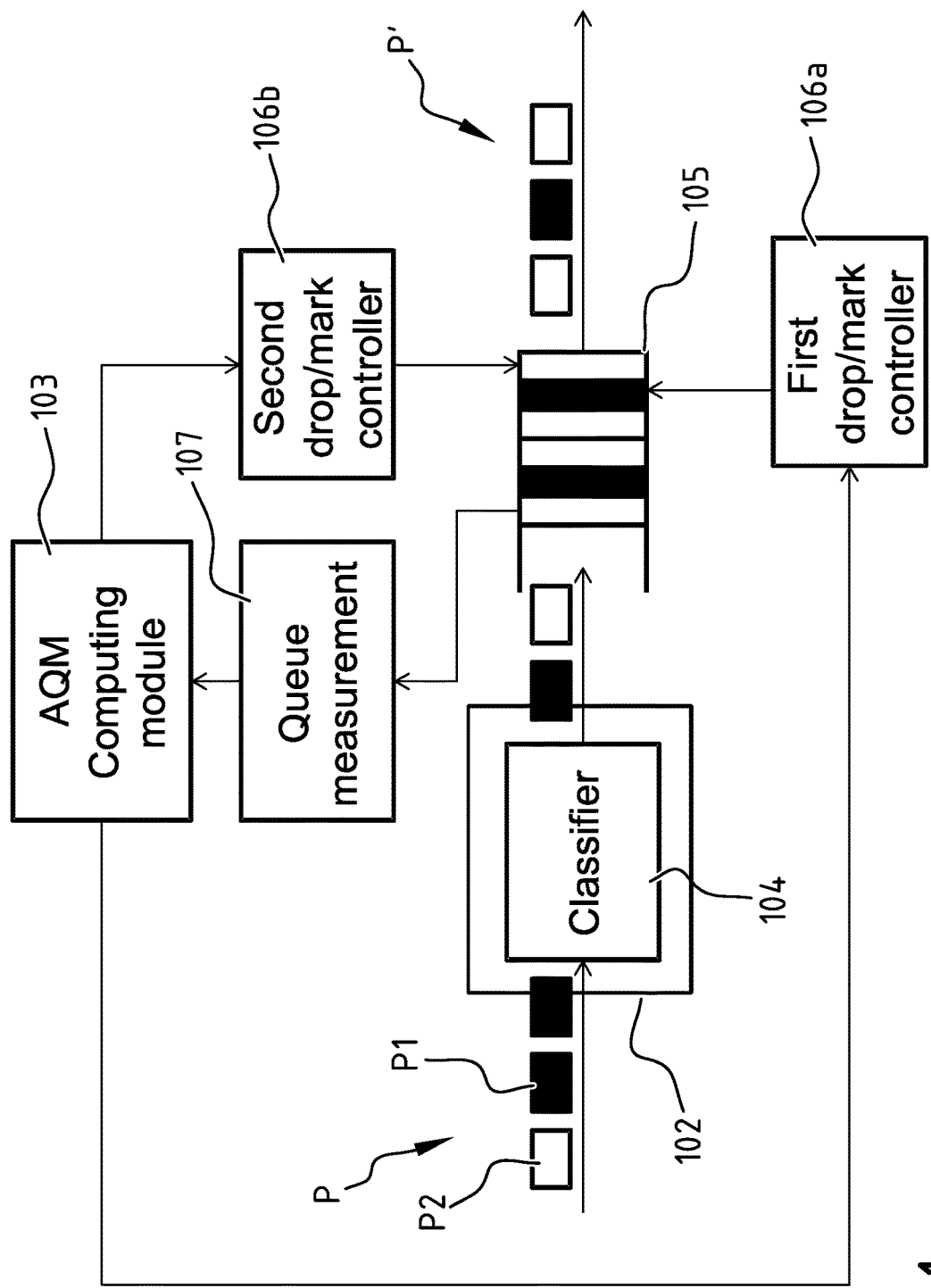
FIG. 1 illustrates schematically a first general embodiment of the invention, using a single queue buffer for two classes of traffic.

FIG. 1 shows an embodiment of a system and method for queue management in a packet-switched network. The system comprises a receiving module 102, a queue buffer 105, a computing module 103, two drop/mark controllers 106a-b, and a measurement device 107. The system is provided at an intermediate node that receives packets P from a sending node and sends packets P' to a receiving node. For simplicity, the sending and receiving node are not shown on this figure.

The receiving module 102 is configured for receiving packets P1, P2 belonging to two or more classes of traffic using a different congestion control mechanism/algorithm in their respective senders requiring different queue management mechanisms in the intermediate nodes. At the intermediate node, packets P1, P2 belonging to two classes of traffic, are received from the sending node. The two classes of traffic are here distinguished by their color-coding, by way of example. In the illustrated embodiment the receiving module 102 comprises a classifier 104 that differentiates received packets P1, P2 of different classes of traffic and e.g. adds an indication to the packet in accordance with the class. Note that the classifying functionality is not required and that the drop/mark controllers 106a-b could also be configured to recognize the class of a packet in the queue buffer 105.

The queue buffer 105 temporarily stores the incoming packets P before they are routed to the receiving node. The drop/mark controllers 106a-b operate on the queue buffer 105 to drop or mark packets in accordance with the corresponding marking or dropping probability.

The computing module 103 is configured for calculating the marking or dropping probability for the first class and the second class, based on one or more measured parameters provided by the queue measurement device 107.

The queue measurement device 107 can extract one or more parameters from the traffic going through the queue. These parameters can be instantaneous queue length, average queue length, packet sojourn time, incoming traffic rate, outgoing traffic rate, instantaneous packet queue overflow, average queue overflow rate, and others known by the person skilled in the art and used in state of the art active queue management (AQM) systems.

Queue buffer 105, queue measurement device 107, computing module 103 and one or more drop/mark controllers 106a-b together are forming an active queue management (AQM) system. The packet drop probability provided by the computing module 103 is adapted to the specific congestion control mechanism used by the traffic in the respective classes, such that the steady state rate of individual flows are fairly approximated to be the same or equal to a predetermined percentage. Alternatively a first marking or dropping probability for a first class of traffic can be calculated as in the state of the art, and other marking or dropping probabilities can be derived from the first marking or dropping probability to approximate a fair steady state rate per flow.

An advantage of this first embodiment is that it is simple and a single queue 105 can be used for multiple classes of differently congestion controlled traffic. A disadvantage is that the queuing sojourn time is the same for all flows of all traffic classes, and specific advantages of certain congestion control/AQM combinations are thus diminished.

Figure 2:
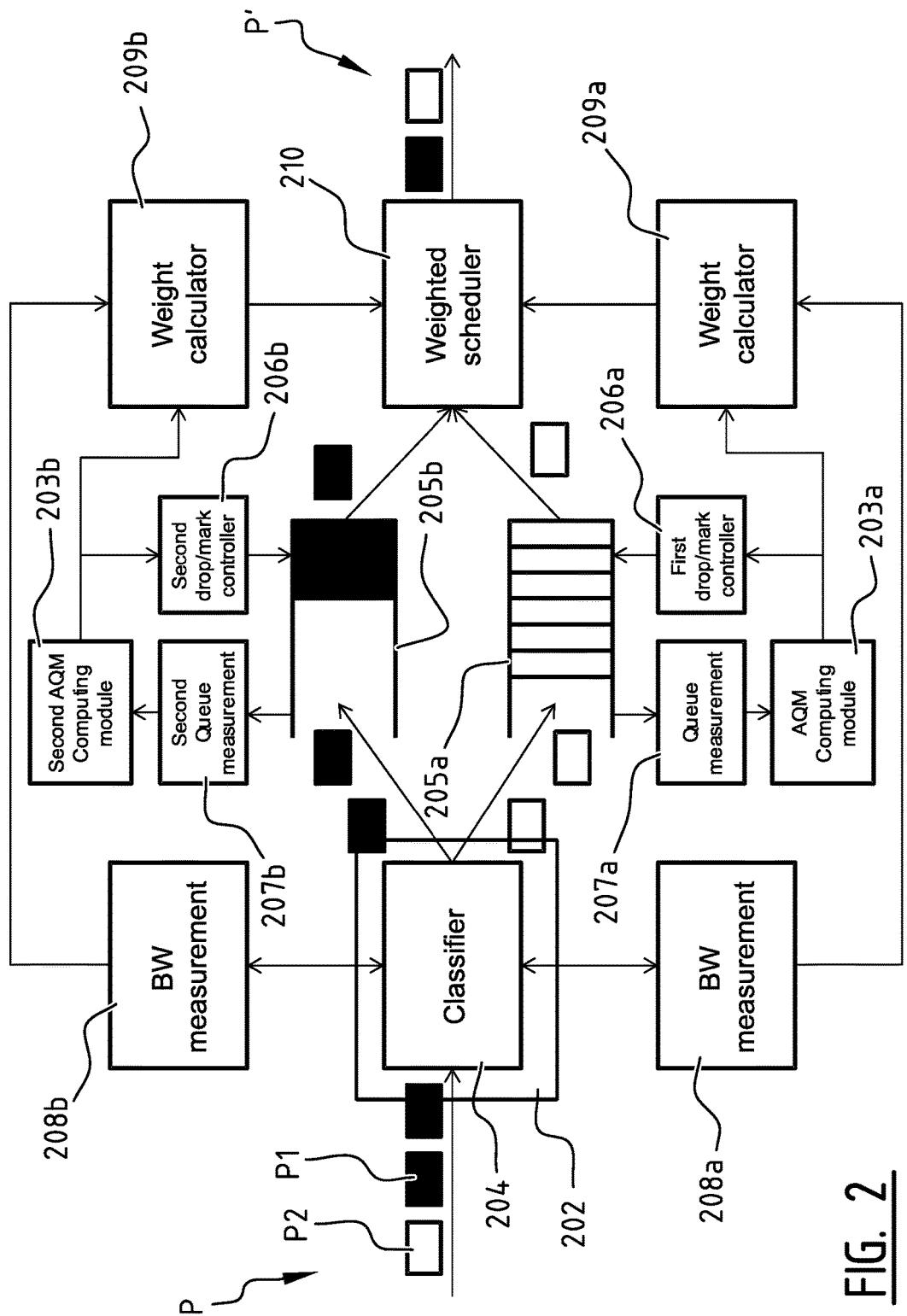
FIG. 2 illustrates schematically a second general embodiment of the system and method, using two queue buffers for two classes of traffic, and bandwidth measurement for weighted scheduling.

FIG. 2 shows an embodiment of a system and method for controlling congestion in a packet-switched network. The system comprises a receiving module 202, two buffer queues 205a-b, two AQM computing modules 203a-b, two drop/mark controllers 206a-b, two queue measurement devices 207a-b, two bandwidth measurement devices 208a-b, two weight calculators 209a-b, and a weighted scheduler 210. The system is provided at an intermediate node that receives packets P from a sending node and sends packets P' to a receiving node.

The receiving module 202 is configured for receiving packets P1, P2 belonging to two or more classes of traffic requiring different congestion control mechanisms. The two classes of traffic are here distinguished by their color-coding, by way of example. In the illustrated embodiment the receiving module 202 comprises a classifier 204 that differentiates received packets P1, P2 of different classes of traffic and classifies them in the first queue 205a or in the second queue 205b in accordance with the class.

The buffer queues 205a-b temporarily store the incoming packets P1, P2 before they are routed to the receiving node. The drop/mark controllers 206a-b operate on the respective buffer queues 205a-b to drop or mark packets in accordance with the corresponding marking or dropping probability. By way of example, each of the two classes of traffic shown in this example is handled by a different buffer queue 205a-b, but other orderings could be envisioned, for instance by coupling several classes of traffic in one buffer queue (as in the example shown in FIG. 1), or by spreading out packets of one class of traffic in two or more buffer queues, or by any combination thereof.

The computing modules 203a-b are configured for calculating the marking or dropping probability for their respective classes, based on one or more measured parameters provided by their respective queue measurement device 207a-b.

The queue measurement devices 207a-b can extract parameters from the traffic going through their respective queues 205a-b. These parameters can be instantaneous queue length, average queue length, packet sojourn time, incoming traffic rate, outgoing traffic rate, instantaneous packet queue overflow, average queue overflow rate, and others known by the person skilled in the art and used in state of the art active queue management (AQM) systems.

Queue 205a, queue measurement device 207a, computing module 203a and a drop/mark controllers 206a together are forming a first active queue management (AQM) system which may be the same as an AQM system known in the state of the art, and the respective b components form a second AQM system.

Note that also a tail drop queue is intended to match this representation. In that case, no drop/mark controller 206a-b is needed as dropping will occur naturally when the queue is full, the queue measurement device 207a-b is configured to measure the average queue overflow (drop) rate, and the computing module 203a-b will pass the average queue overflow or drop rate from the queue measurement device as the drop probability if further needed by e.g. the weight calculators 209a-b, see further.

In the second embodiment, the packet drop probability provided by the independent computing modules 203a-b are used together with the outputs of the bandwidth measurement devices 207a-b by the weight calculators 209a-b to generate a weight adapted to the specific congestion control mechanism used by the traffic in the respective classes, such that the steady state rate of individual flows are fairly approximated to be the same. The weights are taken into account by the weighted scheduler 210 when scheduling outgoing traffic from the respective queues.

Used bandwidths are measured by BW measurement devices 208a-b for each of the classes of traffic of received packets. One weight calculator 209a-b is shown here for each class, but their functionality could be combined.

An advantage of the second embodiment is that each traffic class can use its own queue configuration and AQM scheme and configuration, while the bandwidth of the two or more traffic classes is fairly divided guaranteeing that each flow independent from its traffic class is approximately provided with its fair share of the link capacity.

Figure 3:
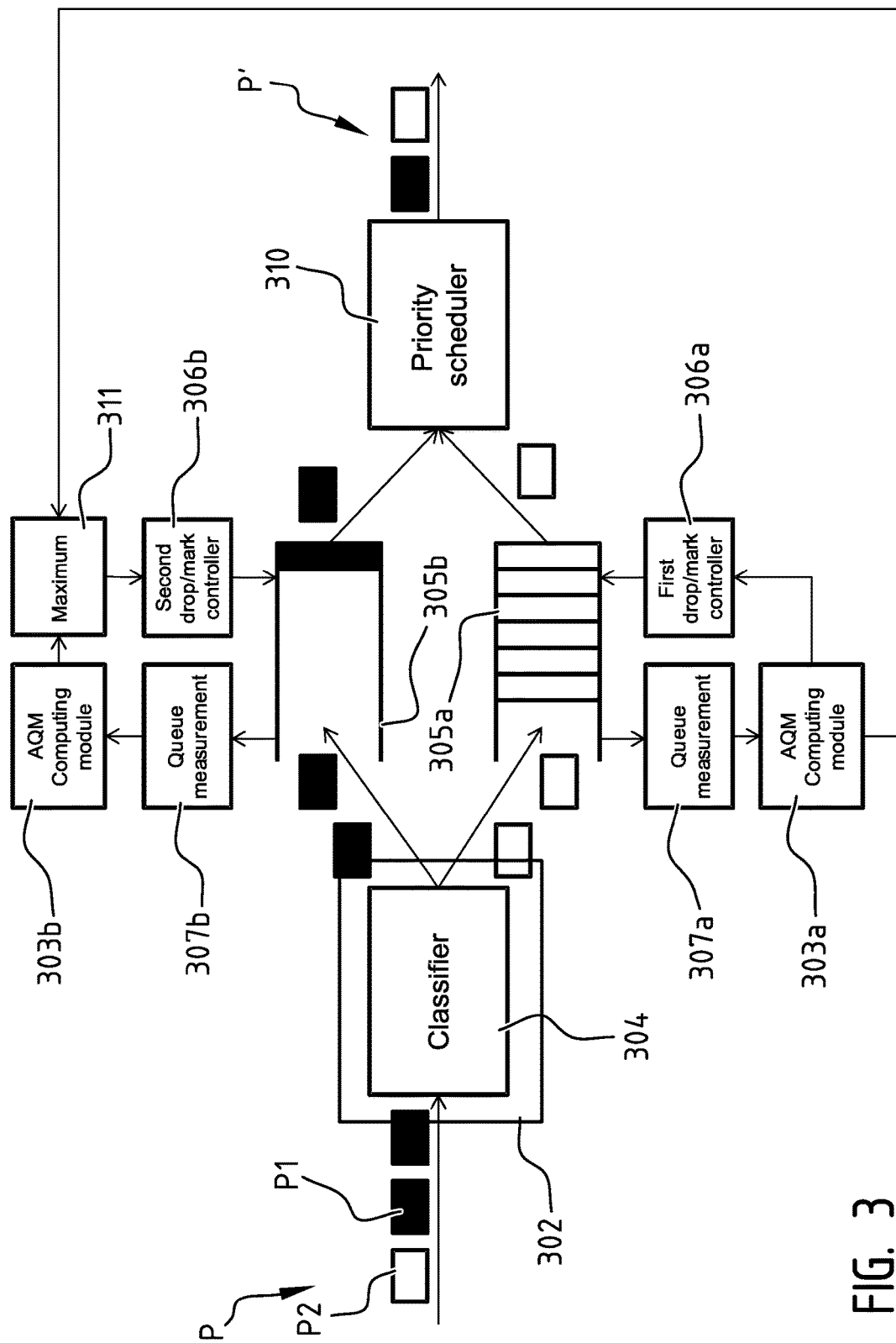
FIG. 3 illustrates schematically a third general embodiment of the system and method, using two queue buffers for two classes of traffic, and priority scheduling.

FIG. 3 shows a third embodiment of a system and method for controlling congestion in a packet-switched network. The system comprises a receiving module 302, two buffer queues 305a-b, two computing modules 303a-b, two drop/mark controllers 306a-b, two queue measurement devices 307a-b, a priority scheduler 310, and a maximum module 311. The system is provided at an intermediate node that receives packets P from a sending node and sends packets P' to a receiving node.

The receiving module 302 is configured for receiving packets P1, P2 belonging to two or more classes of traffic requiring different congestion control mechanisms. The two classes of traffic are here distinguished by their color-coding, by way of example. In the illustrated embodiment the receiving module 302 comprises a classifier 304 that differentiates received packets P1, P2 of different classes of traffic and classifies them in the respective queue 305a-b.

The buffer queues 305a-b temporarily store the incoming packets P before they are routed to the receiving node. The drop/mark controllers 306a-b operate on the respective buffer queues 305a-b to drop or mark packets in accordance with the corresponding marking or dropping probability. By way of example, each of the two classes of traffic shown in this example is handled by one different buffer queue 305a-b, but other orderings could be envisioned, for instance by coupling several classes of traffic in one buffer queue (as in the example shown in FIG. 1), or by spreading out packets of one class of traffic in two or more buffer queues, or by any combination thereof.

The computing modules 303a-b are configured for calculating the marking or dropping probability for their respective classes, based on one or more measured parameters provided by their respective queue measurement device 307a-b.

The queue measurement devices 307a-b can extract parameters from the traffic going through their respective queue 305a-b. These parameters can be instantaneous queue length, average queue length, packet sojourn time, incoming traffic rate, outgoing traffic rate, instantaneous packet queue overflow, average queue overflow rate, and others known by the person skilled in the art and used in state of the art active queue management (AQM) systems.

Queue 305a, queue measurement device 307a, computing module 303a and a drop/mark controllers 306a together are forming a first active queue management (AQM) system which may be similar to an AQM system known in the state of the art, and the respective b components form a second AQM system. Note that also a tail drop queue is intended to match this representation. The coupling between the first AQM system and the second AQM system is reached by having the maximum module 311 which computes the maximum of:
- a parameter measured by the first queue measurement device 307a or a value derived thereof; and
- a parameter measured by the second queue measurement device 307a or a value derived thereof.

This maximum is used to determine the second drop/mark probability which is used by the second drop/mark controller 206b.

In the third embodiment, the first computing modules 303a is also configured to calculate a value which is used to calculate the second packet drop/mark probability adapted to the specific congestion control mechanism used by the second traffic class, such that the steady state rate of individual flows in the second traffic class is approximated to the steady state rate of the first traffic class. This value is based on the first queue measurement device 307a output.

The priority scheduler 310 will first schedule packets from the second queue 305b and if there are no packets in that queue from the first queue 305a. As a result, the second queue 305b will stay mostly empty, and the second computing module 303b will typically provide a very low drop/mark probability. The first queue 305a on the other hand will be most loaded on congestion, and will generate an accordingly higher packet drop/mark adapted to the congestion control mechanism of the respective traffic classes. This results in a second drop/mark probability provided by the first computing module 303a being selected by the maximum module 311. This second drop/mark probability provided by the first computing module 303a is applied to the traffic of the second class by drop/mark controller 306b. This keeps the rate per flow in balance between flows from both traffic classes. Only when there are no flows in the first traffic class, or when an exceptionally high load in the second traffic class is generated, a higher packet drop/mark probability generated by computing module 303b will be triggered, so that the second drop/marking controller 306b will be driven by the value of the second computing module 303b.

An advantage of the third embodiment is that the queuing latency for the one or more traffic classes with the highest scheduling priority is minimized, while keeping a fair share approximation of the bandwidth between all flows over the different traffic classes, and that queue sizes of the traffic classes scheduled with the lowest priority can be large to guarantee full link utility.

Figure 4:
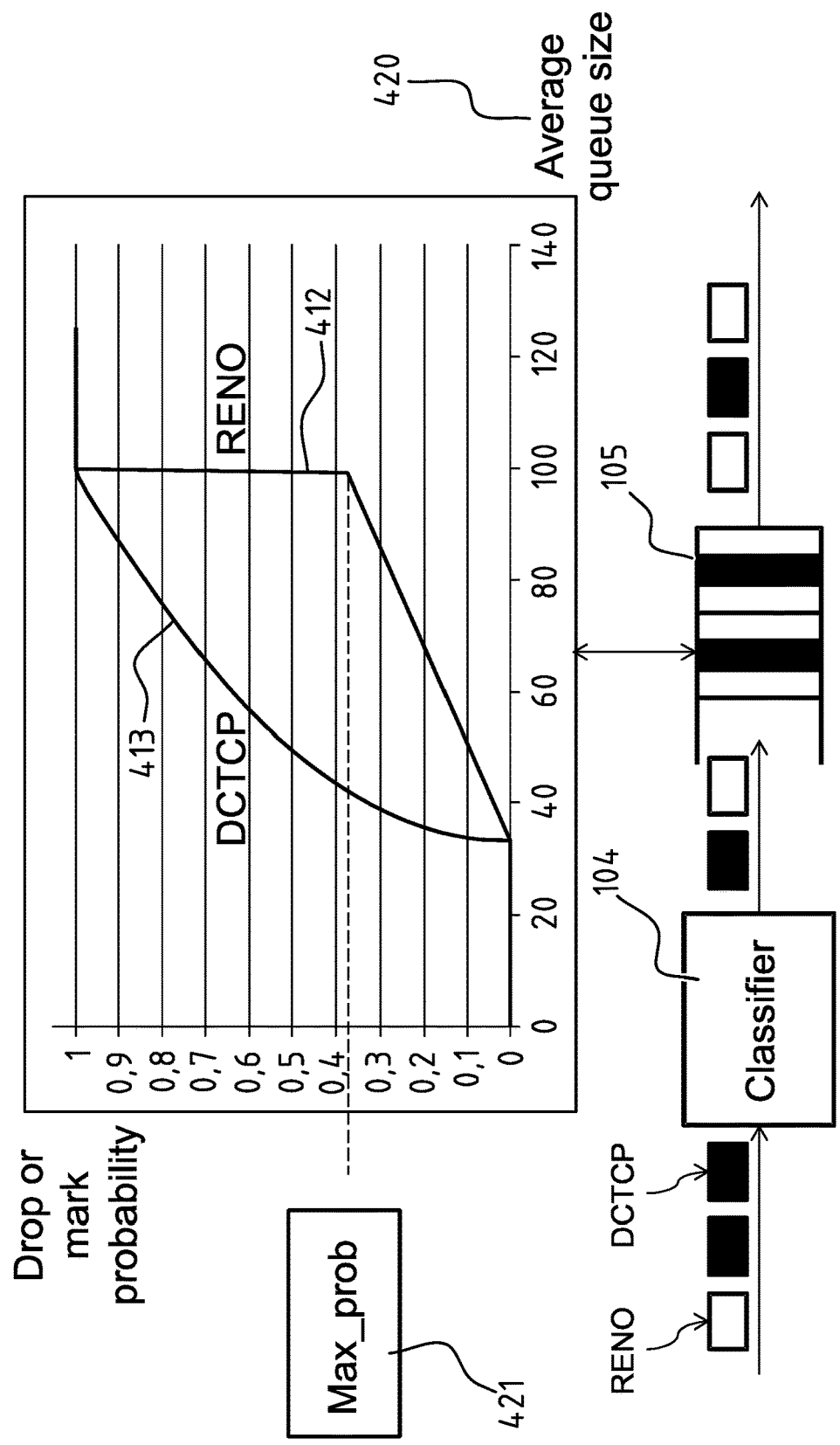
FIG. 4 illustrates schematically a fourth embodiment being a specific embodiment of the first general embodiment with a first class of TCP Reno compatible traffic actively managed with the standard Random Early Drop (RED) AQM and the second class of DCTCP compatible traffic coupled using a modified RED scheme to match the DCTCP congestion control algorithm.

An example of a specific embodiment for the general method described in FIG. 1 is provided in the description of FIG. 4. As an example for illustrating the embodiment of FIG. 1, the specific situation of mixed traffic comprising TCP Reno and DCTCP is discussed. It is known that a TCP Reno flow has a steady state throughput (b_Reno) which is a function of a marking or dropping probability, i.e. a drop or mark probability (p_Reno) and the round trip time (rtt). The marking or dropping probability (p_Reno) is the number of dropped or marked packets (or bytes) divided by the total number of packets (or bytes) in a time interval. The steady state throughput (b_Reno) is defined approximately as follows:

$$b\_Reno = 1{,}225/(rtt * p\_Reno^{\wedge}0.5) \qquad (1)$$

This is a known approximation that is for instance explained in Mathis, M., Semke, J., Mandavi, J., & Ott, T. (1997), "The macroscopic behavior of the TCP congestion avoidance algorithm", ACM SIGCOMM Computer Communication Review, 27(3), 67-82.

For DCTCP the steady state throughput (b_dctcp) can also be expressed by an approximate formula in function of the marking or dropping probability (p_dctcp) and the round trip time (rtt). In a data center environment with very small round trip times (rtt) and the RED AQM configured for DCTCP (with instantaneous queue size and the minimum and maximum threshold configured at the same value (which results in 100% marking if the queue size exceeds the threshold), this relation can be approximated by:

$$b\_dctcp = 2/(rtt * p\_dctcp^{\wedge}2) \qquad (2)$$

This is derived from the following equation:

$$p\_dctcp = (2/W\_max)^{\wedge}0.5 \qquad (3)$$

with p_dctcp the number of marked packets per total packets, thus the packet marking probability, and W_max the maximum congestion window as described in paper: Alizadeh, M., Greenberg, A., Maltz, D. A., Padhye, J., Patel, P., Prabhakar, B., . . . & Sridharan, M. (2010), "Data center tcp (dctcp)", ACM SIGCOMM Computer Communication Review, 40(4), 63-74.

We can rearrange (3) as:

$$W\_max = 2/p\_dctcp^{\wedge}2 \qquad (4)$$

In a window based congestion control mechanism, the steady state bandwidth is defined as:

$$b = W/rtt \qquad (5)$$

with b the steady state bandwidth of one flow, W the average window size and rtt the average round trip time. With a small buffer the maximum window will be close to the average window, and using (4) in (5) will lead to (2).

In a WAN internet environment the round trip times are bigger, and for random early marking it can be assumed that for DCTCP every rtt some packets will be marked. Every rtt the window will be increased with one, or every acknowledged packet will result in an increase of 1/W, with W the average window size. DCTCP will reduce the window every rtt by p_dctcp_r/2 with p_dctcp_r the packet marking probability for random marking. So for steady state both these values should compensate each other, resulting in:

$$p\_dctcp\_r/2 = 1/W \qquad (6)$$

Again after rearranging (6) and using it in (5) will lead to:

$$b\_dctcp\_r = 2/(rtt * p\_dctcp\_r) \qquad (7)$$

So depending on the context, both (2) or (7) or a combination can be used.

To have the two TCP Reno packet flow and the DCTCP packet flow take the same share, the goal is to have (note that it is also possible to set e.g. a 60 percent/40 percent share instead of the same share if that were to be preferred):

$$b\_dctcp(r) = b\_Reno \qquad (8)$$

The first embodiment of the invention aims to couple the marking or dropping probabilities of flows from the two classes. Combining equations (1), (7) and (8) gives the following solutions:

$$p\_Reno = (1{,}225/2 * p\_dctcp\_r)^{\wedge}2 \qquad (9)$$

or:

$$p\_dctcp\_r = 2/1{,}225 * p\_Reno^{\wedge}0.5 \qquad (10)$$

Combining equations (1), (2) and (8) gives the following solutions:

$$p\_Reno = (1{,}225/2)^{\wedge}2 * p\_dctcp^{\wedge}4 \qquad (11)$$

or:

$$p\_dctcp=(2/1,225)^{0.5}*p\_Reno^{0.25} \quad (12)$$

Hence, if p_Reno is derived from a parameter of the queue 105 as measured by measurement device 107, than p_dctcp(_r) may be computed by the computing module 103 using equation (10) or (12).

This embodiment is intended to work on a WAN network to support fair share between DCTCP flows and TCP Reno compatible flows with minimal impact on the existing equipment. Packets supporting Early Congestion Notification (ECN) are assumed to belong to the DCTCP traffic class, and others to the TCP Reno traffic class. In this case DCTCP will get ECN marked packets as congestion feedback, and TCP Reno compatible flows are getting dropped packets as congestion feedback. As a common queue with non DCTCP specific configured RED, using the average queue size with an increasing marking probability is configured, equation (10) applies for determining the packet loss probability for the DCTCP packets. The TCP Reno packets are dropped according to the standard RED configuration, and the DCTCP packets are marked with the probability as derived from the TCP Reno drop probability according to equation (10).

FIG. 4 shows a graph plotting the marking or dropping probability in function of the average queue size, for different a first class of traffic compatible with TCP Reno 412 and a second class of traffic compatible with DCTCP 413, using a RED (random early drop) mark/drop controller where an average buffer queue size 420 results in different dropping probabilities for the two classes which are coupled by e.g. equation (10) above.

To keep the fairness between the flows, the marking or dropping probability of DCTCP flows needs to be higher than for TCP Reno according to equation (10). The RED configuration of the Reno traffic may be using standard RED which drops packets with the probability 412 as a function of the average queue size 420. Preferably, the marking or dropping probability value for the maximum threshold (max_prob 421) for the Reno traffic is chosen such that it results in a marking or dropping probability 413 of 1.0 for DCTCP. DCTCP traffic is marked in accordance with the computed probability using e.g. equation (10), and uses another parameterization than standard RED, or one derived from the standard configuration.

Figure 5:
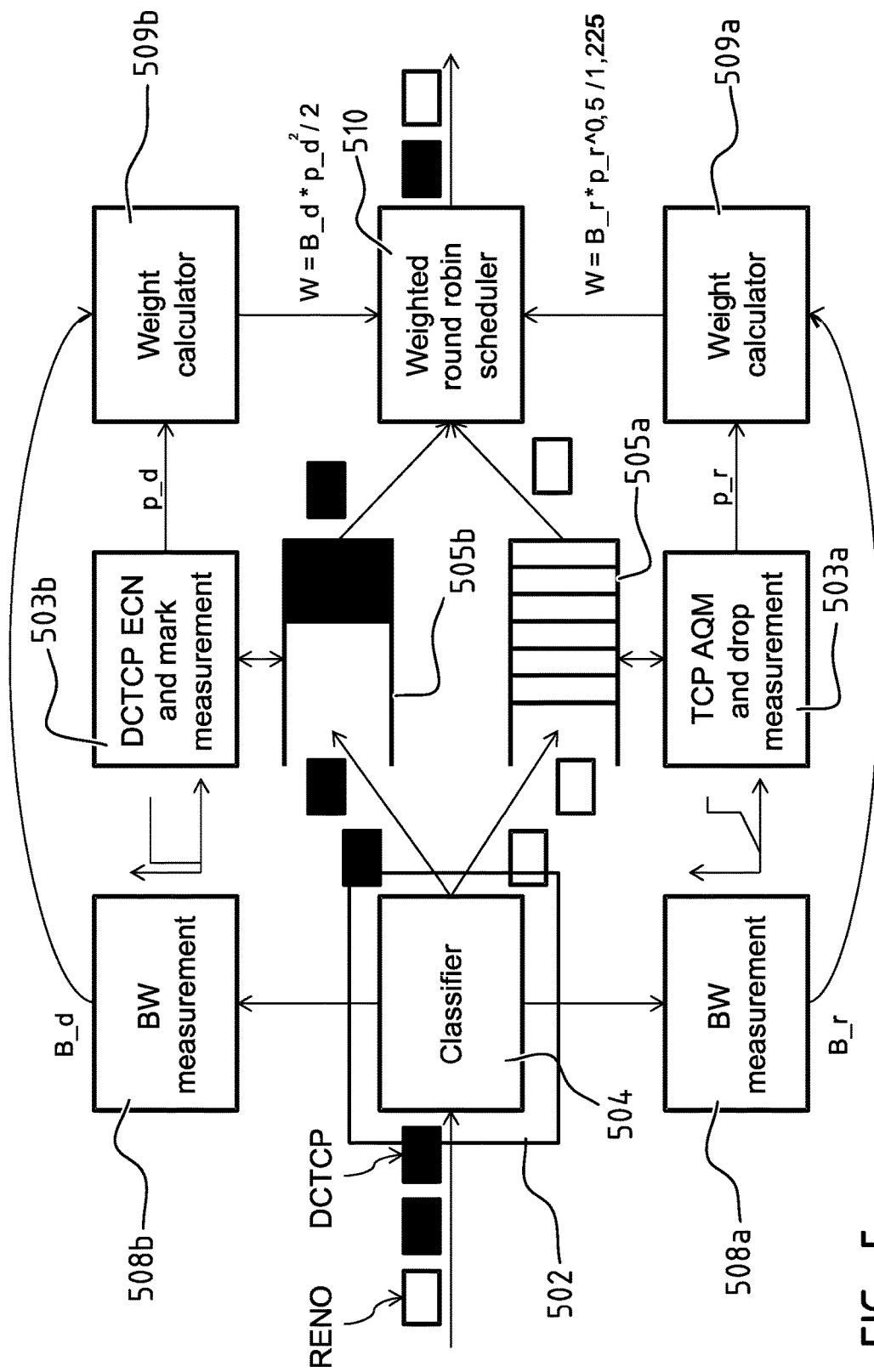
FIG. 5 illustrates schematically a fifth embodiment being a specific embodiment of the second general embodiment with a first class of TCP Reno compatible traffic actively managed with the standard Random Early Drop (RED) AQM and the second class of DCTCP compatible traffic actively managed with the standard DCTCP configured Random Early Drop (RED) AQM.

An example of a specific embodiment for the general method described in FIG. 2 is provided in FIG. 5. The system comprises a receiving module 502, two buffer queues 505a-b, a TCP AQM drop and measurement module 503a, a DCTCP ECN mark and measurement module 503b, two bandwidth measurement devices 508a-b, two weight calculators 509a-b, and a weighted round robin scheduler 510. The system is similar to FIG. 2 with this difference that it is specially adapted for combining TCP Reno with DCTCP. Again the classification of traffic is assumed to be based on the ECN bits in the IP header. If ECN is supported, the packets are marked as congestion controlled according to the DCTCP protocol, and the DCTCP ECN mark and measurement module 503b therefore maps to modules 203b, 206b and 207b from FIG. 2, and is configured to support the DCTCP preferred AQM configuration. The TCP Reno compatible traffic class will be managed with a TCP Reno compatible AQM 503a that drops packets as congestion notification to the senders. This can be any AQM as known by the person skilled in the art, such as for example tail-drop, RED, Codel or Pie. The marking/dropping probabilities measure or applied by the TCP AQM drop and measurement module 503a and the DCTCP ECN mark and measurement module 503b are coupled by a suitable weight calculation of the round robin scheduler 510. In this example the DCTCP buffer queue 505b can be kept much smaller than the TCP Reno buffer queue 505a. The DCTCP buffer queue 505a may be controlled with the preferred DCTCP configuration: immediate buffer queue size (instead of average) and the min_threshold equal to the max_threshold, wherein immediate 100% marking may be applied for all packets when the buffer queue size is bigger than the threshold. TCP Reno can have a preferred AQM drop or a tail-drop configuration. Mark or drop probabilities and bandwidth are measured for both traffic class aggregates and the scheduling weights are may be calculated as described in detail below. The scheduler is shown to be a weighted round robin scheduler 510, but may be any other weighted scheduler, approximating the scheduling weights as calculated below. The bandwidths and drop probabilities are typically measured over a similar time interval.

As an example of the operation of the weight calculators 509a-b, we assume again the DCTCP and TCP Reno traffic classes which can be classified per packet in the network. Preferably, the weights (W_Reno and W_dctcp) used by the scheduler 510 are proportional to a number of flows in a particular traffic class. The number of flows (N_Reno and N_dctcp) can be found by dividing the measured used bandwidth of the aggregates (B_Reno and B_dctcp) by the rate of one flow (b_Reno and b_dctcp) derived from the marking or dropping probabilities:

$$N\_Reno=B\_Reno/b\_Reno \quad (13)$$

and $$N\_dctcp=B\_dctcp/b\_dctcp \quad (14)$$

As the AQM for the DCTCP traffic is configured with the preferred DCTCP AQM configuration, equation (2) is applicable for to determine b_dctcp. For the TCP Reno compatible traffic, equations (1) is applicable. Combining (13) and (14) with (1) and (2) gives:

$$W\_Reno=B\_Reno*p\_Reno^{0.5}/1,225 \quad (15)$$

and $$W\_dctcp=B\_dctcp*p\_dctcp^{2}/2 \quad (16)$$

In FIG. 5 B_dctcp and p_dctcp have been indicated as B_d and p_d, and B_Reno and p_Reno have been indicated as B_r and p_r. Note that (15) and (16) both disregard the round trip time (rtt), as it is usually unknown, and would result in a mix of different values per individual flow. This is accepted as a deviation from the fairness in the state of the art (as for today's TCP on tail-drop queues and also for DCTCP in data centers). Newer congestion control algorithms try to minimize the impact of the round trip time. For example, the CUBIC TCP congestion control algorithm will be less rtt-dependent, as shown in the approximation of (17):

$$b\_cubic=1,166/(rtt^{0.25}*p\_cubic^{0.75}) \quad (17)$$

This can be similarly derived as follows:
The congestion window W is controlled by the following equations:

$$W=C*(t-K)^{3}+W\_max \quad (17.a)$$

$$K=(W\_max*beta/C)^{(1/3)} \quad (17.b)$$

with t the time since the last congestion event, W_max the window size since the last congestion event and beta and C configuration parameters typically for instance beta=0.3 and C=0.6. K is the time when the window W has again reached the size W_max, and where in steady state the next congestion event is expected.

The current bandwidth b_c at time t can be derived by combining (5) with (17.a):

$$b\_c = (C*(t-K)^3 + W\_max)/\text{rtt} \quad (17.c)$$

The number of packets send in a period between two congestion events is equal to 1/p_cubic (with p_cubic the average packet drop probability) and can be calculated by taking the integral of equation (17.c) between t=0 and t=K. After rearranging this results in:

$$1/p\_\text{cubic} = K*(W\_max - C*K^3/4)/\text{rtt} \quad (17.d)$$

Using (17.b) twice to replace K^3 and W_max in (17.d) will give:

$$1/p\_\text{cubic} = (1 - \text{beta}/4)*K^4*C/(\text{rtt}*\text{beta}) \quad (17.e)$$

The steady state bandwidth b_cubic can be expressed as the number of packets sent in one congestion period (=1/p_cubic) divided by the time of one congestion interval (=K):

$$b\_\text{cubic} = 1/(p\_\text{cubic}*K) \quad (17.f)$$

Rearranging (17.e) to K, and plugging this in (17.f) gives:

$$b\_\text{cubic} = (C*(1/\text{beta}-1/4))^{(1/4)}/(p\_\text{cubic}^{(3/4)}*\text{rtt}^{(1/4)}) \quad (17.g)$$

which leads to (17) when using the typical values for beta and C.

There exist yet other mechanisms which are rtt independent and for which the throughput b may be expressed generally as:

$$b = b\_o/p\_n \quad (18)$$

where b_o is a minimum rate, and p_n is the marking probability.

Figure 6:
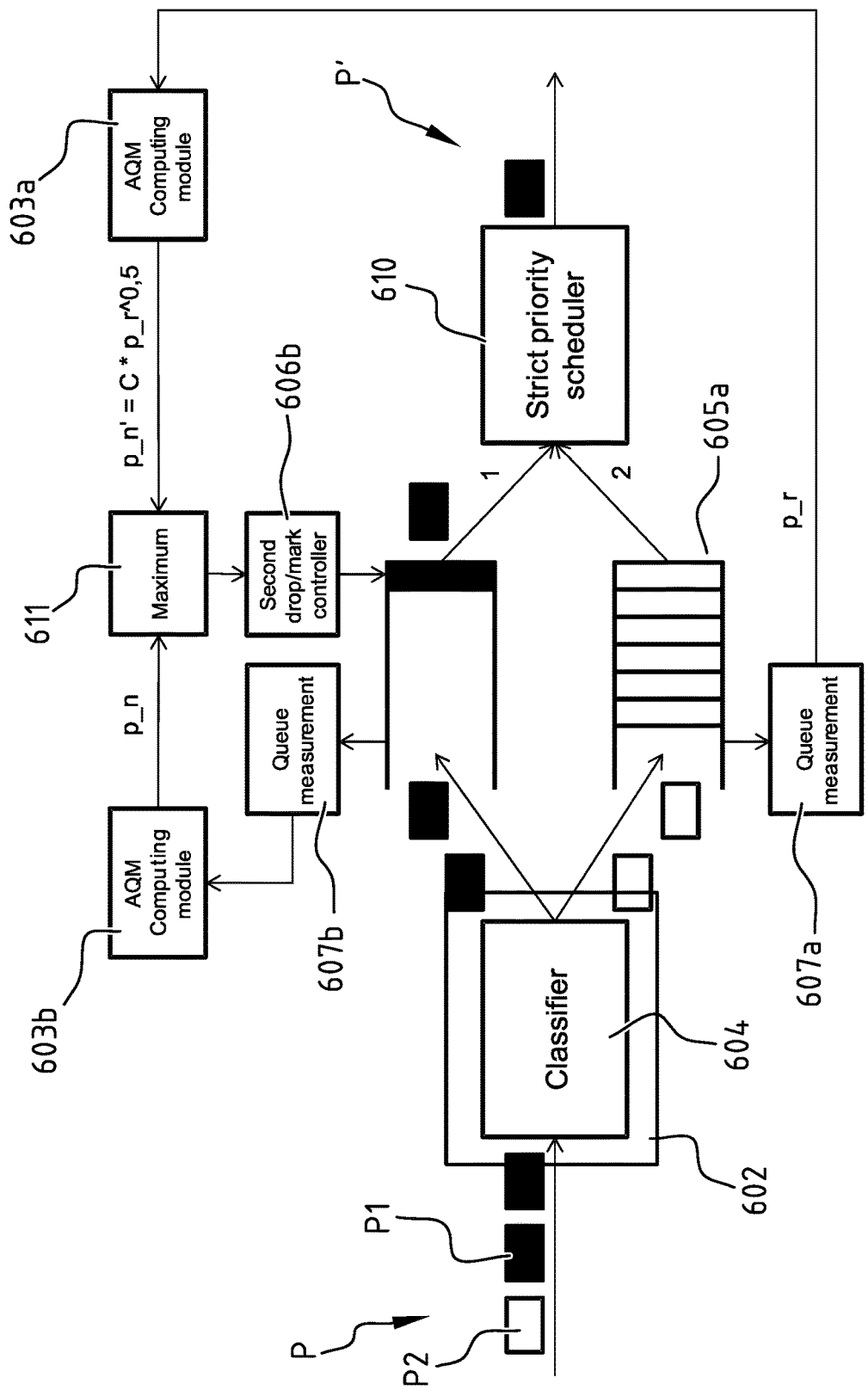
FIG. 6 illustrates schematically a sixth embodiment being a specific embodiment of the third general embodiment with a first class of TCP Reno compatible traffic managed with a standard tail drop queue and the second class of newly congestion controlled traffic actively managed with a novel AQM.

An example of a specific embodiment for the general method described in FIG. 3 is provided in the description of FIG. 6. FIG. 6 shows an embodiment of a system and method for controlling congestion in a packet-switched network. The system comprises a receiving module 602, two buffer queues 605a-b, a computing module 603 comprising two AQM computing modules 603a-b and a maximum module 611, a drop/mark controller 606b, and two measurement devices 607a-b, and a priority scheduler 610. The system is similar to the system of FIG. 3, but is specially adapted for combining TCP Reno with an rtt independent congestion controller.

The method and system shown in FIG. 6 relates to an embodiment where one class of traffic is supposed to have a minimum amount of queuing delay, here corresponding with buffer 605b, but still should have flow fairness compared to the other traffic class. This is achieved by giving that low-latency class priority, but controlling the marking or dropping according to the marking or dropping probability of the other class, here corresponding with the dropping probability of queue 605a measured by queue measurement device 607a, taking into account the congestion response function of both traffic classes, such as in (10), or (12), or for TCP CUBIC:

$$p\_\text{cubic} = (1,166/1,225)^{(4/3)}*p\_\text{Reno}^{(2/3)}*\text{rtt}\_\text{Reno} \quad (19)$$

or:

$$p\_n = (b\_0/1,225)*p\_\text{Reno}^{0.5}*\text{rtt}\_\text{Reno} \quad (20)$$

Equation (19) and (20) can be derived after rearranging from b_cubic=b_Reno, (1) and (17) and b_rpf=b_Reno, (1) and (18) respectively.

In (19) and (20) the Reno rtt factor is different per flow and can for instance be configured as the average or minimum expected value in a specific network topology.

In the sixth embodiment the congestion controller in the end points of a second traffic class may be behaving e.g. according to equation (18) and a first traffic class according to TCP Reno, see equation (1). It is assumed that the endpoints of the second traffic class are pacing the packets P2 and that a very small buffer queue 605b is sufficient under normal conditions. TCP Reno traffic is for example handled with a simple tail-drop buffer queue 605a or alternatively with an RED AQM. The marking probability p_n' provided by AQM computing module 603a may be determined e.g. using equation (20), rearranged as (21) in FIG. 6:

$$p\_n' = C*p\_r^{0.5} \quad (21)$$

with C=b_o*rtt/1,225 and rtt for instance the minimum expected rtt; and with p_r the first drop/mark probability of the first queue 605a (p_r matching p_Reno in this specific embodiment).

Some advantages of embodiments of the present invention are listed below. Embodiments allow to control mixes of cloud-internal and internet traffic. For instance in distributed clouds, cloud traffic can compete fairly with internet traffic. Optionally more complex fairness policies and guarantees can be achieved with known impact on both traffic types. Additionally, embodiments may automatically load-balance the link capacities over the different users without continuous reconfiguration of capacity assignments. Some embodiments further allow to gradually introduce new congestion control and AQM mechanisms, which is especially important for interactive applications like gaming, web applications, video conferencing, and cloud based applications.

A person of skill in the art would readily recognize that steps of various above described methods can be performed by programmed computers. Herein, some embodiments are also intended to cover program storage devices, e.g., digital data storage media, which are machine or computer readable and encode machine executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the figures, including any functional blocks labeled as "processors" or "means", "devices" or "modules" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included.

Whilst the principles of the invention have been set out above in connection with specific embodiments, it is to be understood that this description is merely made by way of example and not as a limitation of the scope of protection which is determined by the appended claims.

The invention claimed is:

1. A method for queue management in a packet-switched network comprising one or more intermediate network nodes, the method comprising at an intermediate node:
   receiving first packets belonging to a first class associated with a first queue management mechanism and second packets belonging to a second class associated with a second queue management mechanism;
   marking or dropping of the first packets in accordance with the first queue management mechanism and marking or dropping of the second packets in accordance with the second queue management mechanism; and
   coupling the marking or dropping of the second packets to the marking or dropping of the first packets,
   wherein the marking or dropping of the first packets is performed in accordance with a first marking or dropping probability and the marking or dropping of the second packets is performed in accordance with a second marking or dropping probability; and wherein the coupling comprises computing the second marking or dropping probability based on the first marking or dropping probability.

2. The method of claim 1, wherein the received first and second packets are stored in at least one queue buffer, and the first marking or dropping probability is determined based on a measure related to the number of first and second packets in the at least one queue.

3. The method of claim 1, wherein the receiving comprises classifying the first packets in a first queue and the second packets in a second queue; and the coupling comprises scheduling the transmission of marked or non-dropped first and second packets from the first queue and the second queue in accordance with a first and a second weight.

4. The method of claim 3, wherein a first used bandwidth is measured for the first packets and a second used bandwidth is measured for the second packets; wherein the first and second used bandwidth is used to calculate the first and the second weight, respectively.

5. The method of claim 3, wherein the marking or dropping of the first packets is performed in accordance with a first marking or dropping probability and the marking or dropping of the second packets is performed in accordance with a second marking or dropping probability; wherein the first and second marking or dropping probability is used to determine the first and second weight, respectively.

6. The method of claim 1, wherein the receiving comprises classifying the first packets in a first queue and the second packets in a second queue; and the method further comprises scheduling the transmission of marked or non-dropped second packets from the second queue with priority compared to the first packets of the first queue.

7. The method of claim 1, wherein the first and second class are associated to any of the following protocols: Transmission Control Protocol (TCP) Reno, Transmission Control Protocol (TCP) New Reno, CUBIC Transmission Control Protocol (TCP), High Speed TCP, Compound TCP, Scalable TCP, User Datagram Protocol (UDP) using TCP Friendly Rate Control (TFRC), Multiple TCP (MULTCP), Multiple TFRC (MULTFRC), Datagram Congestion Control Protocol (DCCP), Data Center TCP (DCTCP), DCTCP, DCTCP.

8. The method of claim 1, wherein said coupling is such that flows of the first packets and flows of the second packets are given a predetermined share, in particular a fair share, of an available bandwidth.

9. The method of claim 1, wherein the coupling the marking or dropping includes setting a ratio of a bandwidth of the first packets to a bandwidth of the second packets to a given ratio.

10. A system for queue management in a packet-switched network, the system comprising:
    a receiving module for receiving first packets belonging to a first class associated with a first queue management mechanism and second packets belonging to a second class associated with a second queue management mechanism;
    said system being configured for marking or dropping of the first packets in accordance with the first queue management mechanism and for marking or dropping of the second packets in accordance with the second queue management mechanism; and for coupling the marking or dropping of the second packets to the marking or dropping of the first packets,
    wherein the system is adapted for marking or dropping of the first packets in accordance with a first marking or dropping probability;
    said system further including,
    a controller configured for marking or dropping of the second packets in accordance with a second marking or dropping probability, and
    a computing module configured for computing the second marking or dropping probability based on the first marking or dropping probability.

11. The system of claim 10, further comprising at least one queue buffer for storing the received first and second packets, and wherein the computing module is further configured for determining the first marking or dropping probability based on a measure related to the number of first and second packets in the at least one queue buffer.

12. The system of claim 10, wherein the receiving module comprises a classifier for classifying the first packets in a first queue and the second packets in a second queue; the system further comprising a scheduler configured for scheduling the transmission of marked or non-dropped first and second packets from the first queue and the second queue in accordance with a first and a second weight;
    optionally comprising a measuring device configured for measuring a first used bandwidth for the first packets and a second used bandwidth for the second packets; and a weight calculator configured for using the first and second used bandwidth to calculate the first and the second weight, the system being optionally configured for marking or dropping of the first packets in accordance with a first marking or dropping probability and marking or dropping of the second packets in accordance with a second marking or dropping probability; wherein the weight calculator is configured to calculate the first and second weight based on the first and second marking or dropping probability, respectively.

13. The system of claim 10, wherein the receiving module comprises a classifier configured for classifying the first packets in a first queue and the second packets in a second queue; and the system further comprises a priority scheduler configured for scheduling the transmission of marked or non-dropped second packets from the second queue with priority compared to the first packets of the first queue.

14. The system of claim 10, wherein the coupling the marking or dropping includes setting a ratio of a bandwidth of the first packets to a bandwidth of the second packets to a given ratio.

15. Computer device or other hardware device programmed to perform the computing and controlling of the method of claim 1.

* * * * *